United States Patent
Fujii (10) Patent No.: US 8,400,682 B2
(45) Date of Patent: Mar. 19, 2013

(54) IMAGE RECORDING APPARATUS AND STORAGE MEDIUM STORING PROGRAM

(75) Inventor: Hiroaki Fujii, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 812 days.

(21) Appl. No.: 12/607,906

(22) Filed: Oct. 28, 2009

(65) Prior Publication Data

US 2010/0165365 A1 Jul. 1, 2010

(30) Foreign Application Priority Data

Dec. 26, 2008 (JP) ................................ 2008-332734

(51) Int. Cl.
G06T 5/00 (2006.01)
H04N 1/407 (2006.01)
H04N 1/40 (2006.01)
G06F 3/12 (2006.01)
G06K 15/00 (2006.01)

(52) U.S. Cl. ............ 358/3.26; 358/1.12; 358/1.13; 358/1.18; 358/2.1; 347/5; 347/6

(58) Field of Classification Search .......... 358/1.13, 358/1.18, 2.1, 3.26, 296; 347/5, 6, 16
See application file for complete search history.

(56) References Cited

U.S. PATENT DOCUMENTS

| 6,752,481 | B1* | 6/2004 | Takahashi et al. ........... 347/9 |
| 7,311,368 | B2* | 12/2007 | Kawakami ................ 347/5 |
| 7,440,709 | B2* | 10/2008 | Mima et al. ............... 399/82 |
| 7,646,509 | B1* | 1/2010 | Nagarajan et al. ........... 358/1.9 |
| 7,782,486 | B2* | 8/2010 | Nakano et al. ............. 358/1.9 |
| 7,860,425 | B2* | 12/2010 | Mima et al. ............... 399/82 |
| 7,889,405 | B2* | 2/2011 | Takami et al. ............. 358/527 |
| 8,115,968 | B2* | 2/2012 | Mano et al. .............. 358/448 |
| 2008/0225346 | A1* | 9/2008 | Mano et al. .............. 358/448 |

FOREIGN PATENT DOCUMENTS

| JP | 2000-043242 A | 2/2000 |
| JP | 2004-110585 A | 4/2004 |

* cited by examiner

*Primary Examiner* — King Poon
*Assistant Examiner* — Jonathan Beckley
(74) *Attorney, Agent, or Firm* — Baker Botts L.L.P.

(57) ABSTRACT

An image recording apparatus including: a storing portion configured to store first image data based on which recording is performed on one of recording surfaces of a recording medium and second image data based on which the recording is performed on the other surface; a first density adjusting section configured to make an adjustment to a recording density for at least part of the first image data on the basis of an input of a user; a second density adjusting section configured to make an adjustment to a recording density for at least part of the second image data, the adjustment being reverse to the adjustment by the first density adjusting section; and a recording section configured to perform the recording on the basis of the first image data adjusted by the first density adjusting section and the second image data adjusted by the second density adjusting section.

13 Claims, 9 Drawing Sheets

IMAGE RECORDING APPARATUS AND STORAGE MEDIUM STORING PROGRAM

CROSS REFERENCE TO RELATED APPLICATION

The present application claims priority from Japanese Patent Application No. 2008-332734, which was filed on Dec. 26, 2008, the disclosure of which is herein incorporated by reference in its entirety.

BACKGROUND OF THE INVENTION

Field of the Invention

The present invention relates to an image recording apparatus configured to perform a two-sided recording and a storage medium storing a computer program for controlling the image recording apparatus.

Conventionally, various techniques for a two-sided recording have been proposed.

For example, one of the conventional techniques is a technique that, in order to restrain an effect of what is called a strike-through (a see-through) in which an image recorded on one surface of a recording medium is seen through from the other surface thereof in the two-sided recording, where color tones of images of the respective surfaces which are opposite to each other (or overlap with each other) are greatly different from each other, recording data corresponding to the images are subjected to a converting processing, and where the color tones are relatively close to each other, the converting processing is not performed. However, even where the color tones in the respective surfaces are close to each other, a high image density causes the strike-through. Thus, the technique is not sufficient to solve the problem.

In another conventional technique, recording data corresponding to an image which is expected that the strike-through is relatively serious is corrected in advance, and the corrected recording data is outputted. Further, the user selects whether the correction is performed or not and selects an area to which the correction is applied.

SUMMARY OF THE INVENTION

However, a user interface in the just-mentioned conventional technique may not be easy for a user to operate, so that it is not easy to perform a correcting processing which satisfies a demand of the user. Further, in the two-sided recording, there is another problem in which a recording medium (e.g., a recording sheet) is warped due to a soakage of ink, which causes a jamming of the recording medium and an ink stain. However, this problem has not been solved in the conventional techniques.

The present invention has been developed in view of the above-described situations, and it is an object of the present invention to provide (a) an image recording apparatus including a new user interface which allows an intuitive and easy operation and easy adjustment of an image quality in a two-sided recording, and prevents a jamming of a sheet and an ink stain in the two-sided recording and (b) a storage medium storing a computer program for controlling the image recording apparatus.

The object indicated above may be achieved according to the present invention which provides an image recording apparatus configured to perform recording on both recording surfaces of a recording medium, comprising: a storing portion configured to store (a) first image data based on which the recording is performed on one of the recording surfaces of the recording medium and (b) second image data based on which the recording is performed on the other of the recording surfaces of the recording medium; a first density adjusting section configured to make an adjustment to a recording density for at least part of the first image data on the basis of an input of a user; a second density adjusting section configured to make an adjustment to a recording density for at least part of the second image data, the adjustment being reverse to the adjustment to the recording density by the first density adjusting section; and a recording section configured to perform the recording on the basis of (a) the first image data adjusted by the first density adjusting section and (b) the second image data adjusted by the second density adjusting section.

The object indicated above may be also achieved according to the present invention which provides a storage medium storing a program executed by an image recording apparatus configured to perform recording on both recording surfaces of a recording medium, the program comprising: making an adjustment to a recording density for at least part of first image data stored in a storing portion, on the basis of an input of a user; making an adjustment to a recording density for at least part of second image data stored in the storing portion, the adjustment being reverse to the adjustment to the recording density for the at least part of the first image data; and performing the recording on the basis of the first image data and the second image data.

BRIEF DESCRIPTION OF THE DRAWINGS

The objects, features, advantages, and technical and industrial significance of the present invention will be better understood by reading the following detailed description of an embodiment of the invention, when considered in connection with the accompanying drawings, in which.

DESCRIPTION OF THE EMBODIMENT

Figure 1:
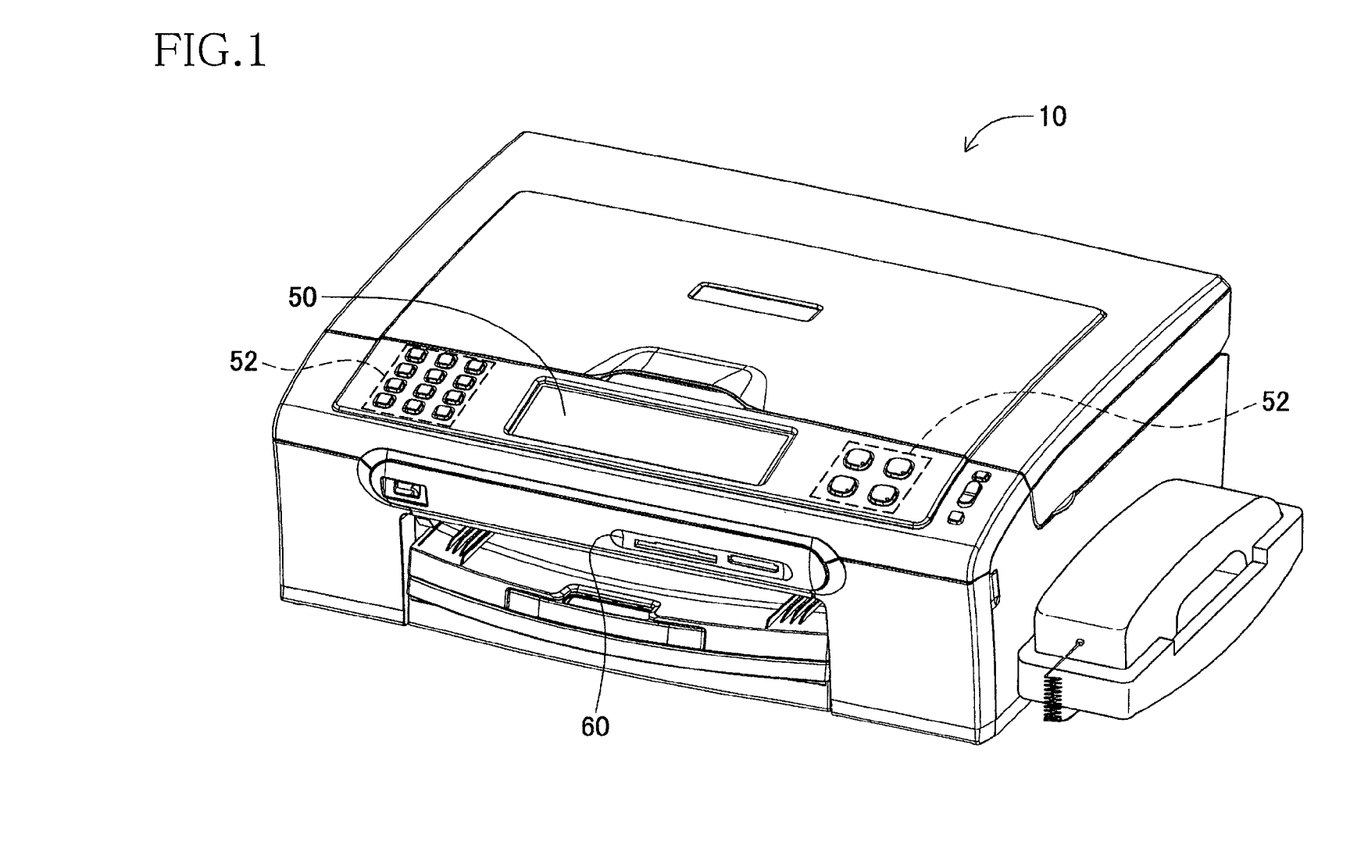
FIG. 1 is an external view of a multi-function device (MFD)

Hereinafter, there will be described an embodiment of the present invention by reference to the drawings. A multi-function device (MFD) 10 as an example of a recording apparatus to which the present invention is applied has a printing function, a copying function, and so on. As shown in FIG. 1, a display panel (a preview displaying portion) 50 and a key pad 52 are provided on a front and upper surface of the MFD 10. The display panel 50 is provided by a touch panel display so as to detect coordinates of a position at which a user has touched the display panel 50. The key pad 52 includes a plurality of keys. The user can input various commands to the MFD 10 with the display panel 50 and the key pad 52.

Figure 2:
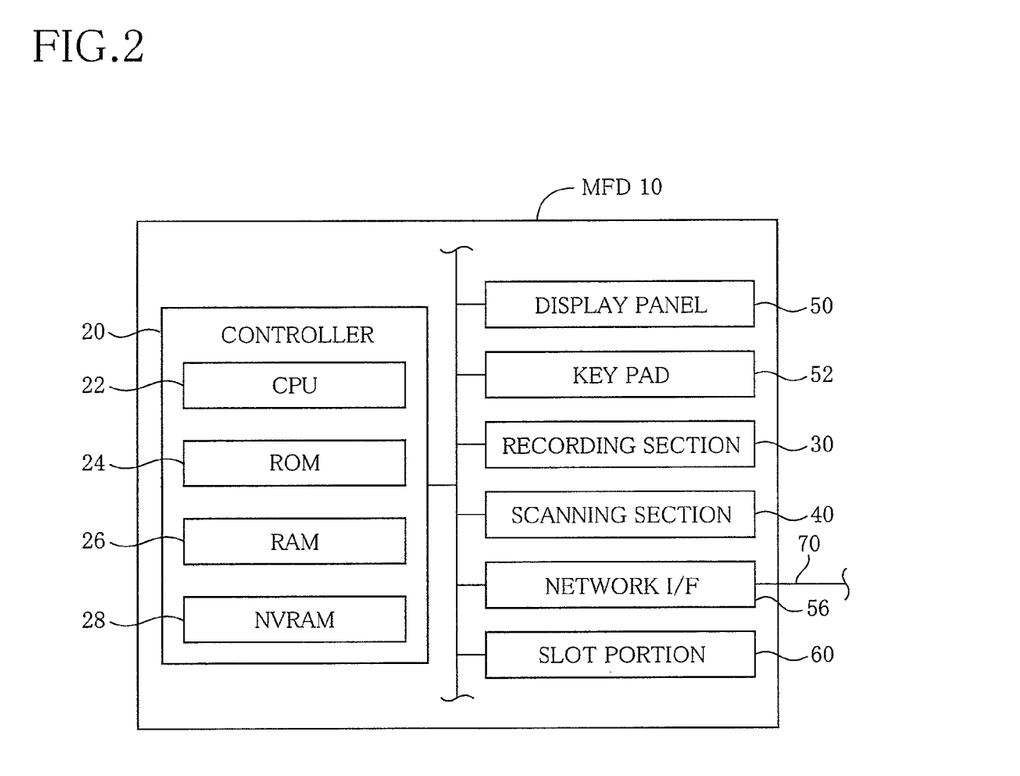
FIG. 2 is a block diagram showing a configuration of the MFD.

With reference to FIG. 2, the MFD 10 includes a controller 20, the display panel 50, the key pad 52, a recording section 30, a scanning section 40, and so on.

The controller 20 includes a CPU 22, a ROM 24, a RAM (a storing portion, a density-information storing portion) 26, an NVRAM 28, and so on. The CPU 22 performs various processings in accordance with programs stored in the ROM 24. The processings performed by the CPU 22 will be explained in detail below. The ROM 24 stores programs for controlling operations of the MFD 10. The RAM 26 stores various data produced in a process in which the processings are performed in accordance with the programs, such as data based on which an image is displayed on the display panel 50, data based on which an image is recorded on a medium, and so on. The NVRAM 28 stores various parameters used when the CPU 22 performs the processings in accordance with the programs, such as a recording setting, a scanning setting, and so on.

The MFD 10 thus configured performs recording on opposite or both recording surfaces of a recording medium such as a sheet. There will be explained a two-sided recording processing with reference to flow-charts in FIGS. 3-7.

Figure 3:
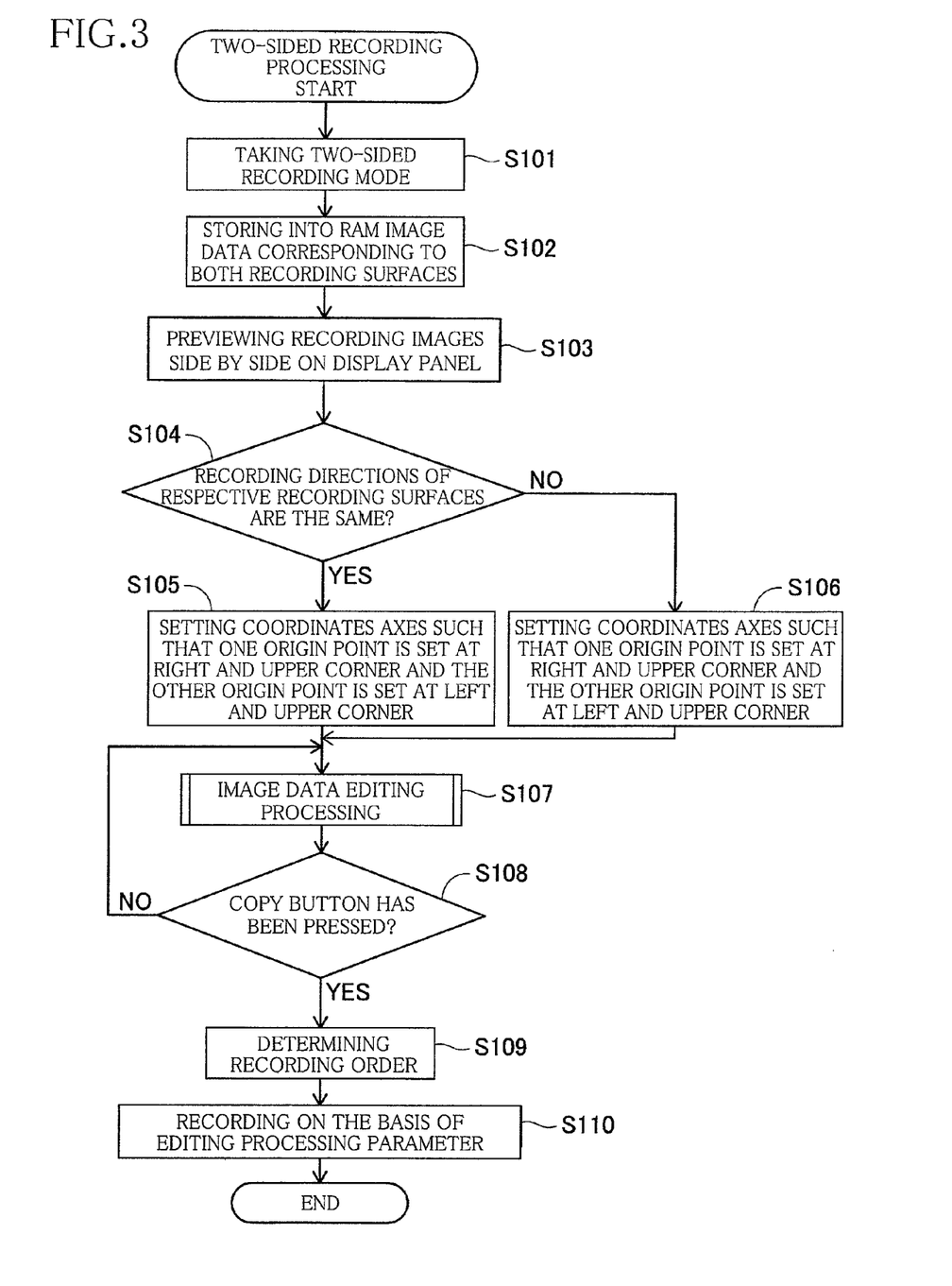
FIG. 3 is a flow-chart indicating a main processing of a two-sided recording.

In S101, the CPU 22 takes a two-sided recording mode. For example, when a predetermined one of touch-panel button images displayed on the display panel 50 is pressed by the user, the CPU 22 takes the two-sided recording mode. Where the CPU 22 takes the two-sided recording mode, a total amount of ink to be ejected onto both recording surfaces is restrained by the recording setting stored in the NVRAM 28, for example, in order to restrain soakage of the ink into one of the recording surfaces which is opposite to the other recording surface to be subjected to the recording. In S102, the CPU 22 stores image data corresponding to the both recording surfaces into the RAM 26. It is noted that the image data may be obtained in any manner. For example, it is possible to take the image data from, e.g., a memory card via a slot portion 60, to read the image data from a read medium by the scanning section 40, and to take the image data, via a network interface 56, from a personal computer connected to a LAN line 70.

Figure 8A:
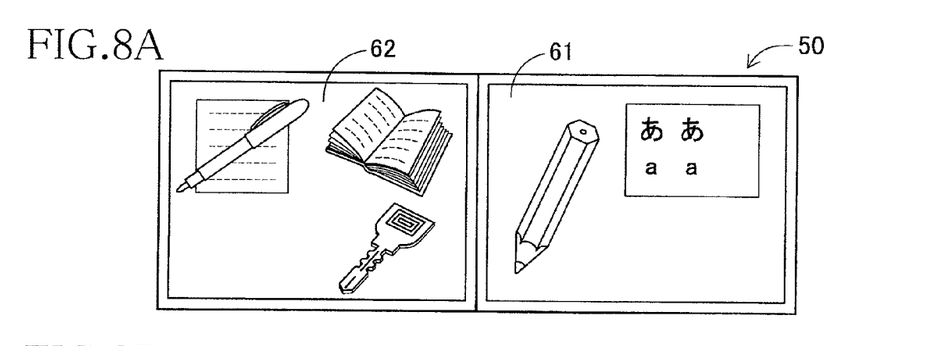
FIGS. 8A, 8B, 8C, 8D are views each showing an example of image displaying on a display panel.

In S103, the CPU 22 previews recording images of the respective both recording surfaces side by side on the display panel 50 on the basis of the image data of the both recording surfaces stored in the RAM 26. FIG. 8A shows an example of the display panel 50 on which the recording images are previewed in S103. It is noted that on a right screen or a right portion of the display panel 50 is displayed a first image 61 representing a recording image of image data (first image data) based on which an image is recorded on one of the recording surfaces of an object recording medium, and on a left screen or a left portion of the display panel 50 is displayed a second image 62 representing a recording image of image data (second image data) based on which an image is recorded on the other of the recording surfaces of the object recording medium.

In S104, the CPU 22 judges whether recording directions of the respective both recording surfaces of the object recording medium are the same as each other or not, that is, whether a recording direction of one of the recording surfaces of the object recording medium and a recording direction of the other of the recording surfaces of the object recording medium are the same as each other or not. The judgment in S104 is performed on the basis of a layout setting in the two-sided recording which setting is included in the recording setting stored in the NVRAM 28, for example. That is, where a portion on a back side of an upper portion of the image of one of the recording surfaces coincides with an upper portion of the image of the other of the recording surfaces, it can be said that the recording direction of the one recording surface and the recording direction of the other recording surface are the same as each other. On the other hand, where the portion on the back side of the upper portion of the image of the one recording surface coincides with a lower portion of the image of the other recording surface, it can be said that the recording direction of the one recording surface and the recording direction of the other recording surface are not the same as each other. Where the recording direction of the one recording surface on which the image recording is performed on the basis of the first image data and the recording direction of the other recording surface on which the image recording is performed on the basis of the second image data are the same as each other (S104: YES), the CPU 22 sets in S105, for the first image 61, coordinates axes whose origin point is set to a right and upper corner of the previewed first image 61, and sets an upward and downward axis extending downward from the origin point and a rightward and leftward axis extending leftward from the origin point. Further, the CPU 22 sets in S105, for the second image 62, coordinates axes whose origin point is set to a left and upper corner of the previewed second image 62, and sets an upward and downward axis extending downward from the origin point and a rightward and leftward axis extending rightward from the origin point. It is noted that axis directions of the coordinates axes for the one and the other recording surfaces set in S105 are symmetrical with each other with respect to the upward and downward axis. On the other hand, where the recording direction of the one recording surface on which the image recording is performed on the basis of the first image data and the recording direction of the other recording surface on which the image recording is performed on the basis of the second image data are not the same as each other (S104: NO), the CPU 22 sets in S106, for the first image 61, coordinates axes whose origin point is set to the right and upper corner of the previewed first image 61, and sets an upward and downward axis extending downward from the origin point and a rightward and leftward axis extending leftward from the origin point. Further, the CPU 22 sets in S106, for the second image 62, coordinates axes whose origin point is set to a right and lower corner of the previewed second image 62, and sets an upward and downward axis extending upward from the origin point and a rightward and leftward axis extending leftward from the origin point. It is noted that axis directions of the coordinates axes for the one and the other recording surfaces set in S106 are symmetrical with each other with respect to the rightward and leftward axis. The CPU 22 can identify an overlapping position in the two-sided recording on the basis of upward and downward layouts of the both recording surfaces by the processings of S104-S106. Where the settings of the coordinates axes in S105, S106 are completed, the CPU 22 performs an image data editing processing in S107.

Figure 4:
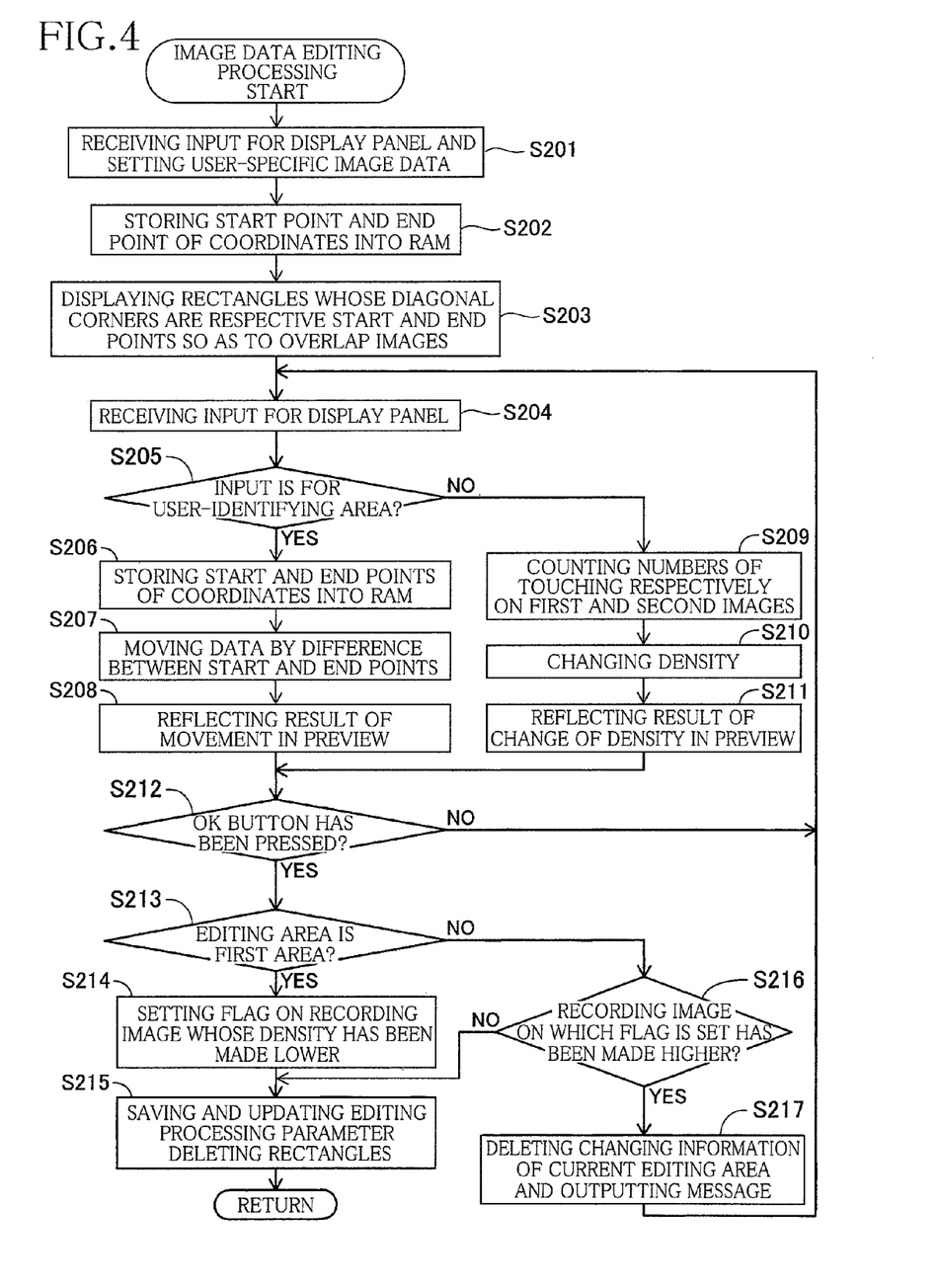
FIG. 4 is a flow-chart indicating an image data editing processing.
Figure 8B:
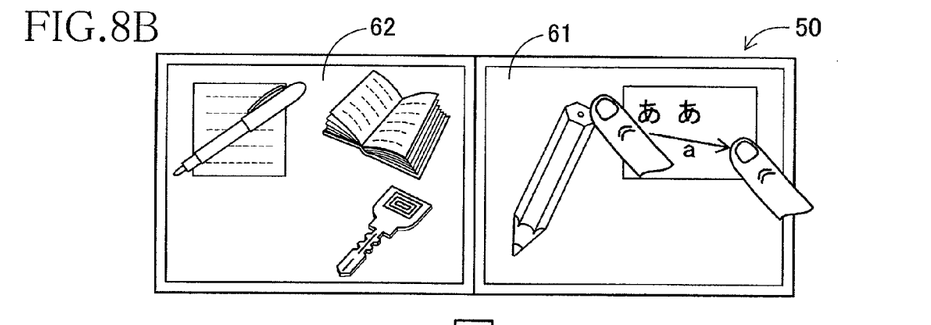

Here, there will be explained the image data editing processing in S107 in detail with reference to the flow-chart in FIG. 4. In S201, the CPU 22 receives an input of the user with the display panel 50. The user performs the input operation for the display panel 50 by sliding his or her finger on the screen of the display panel 50, i.e., by performing what is called a dragging operation. As shown in FIG. 8B, where the user drags his or her finger on the first image 61 displayed on the right screen of the display panel 50, the CPU 22 sets, as user-specific image data, the first image data corresponding to the first image 61 and sets, as non-user-specific image data, second image data corresponding to the second image 62 displayed on a left screen or a left portion of the display panel 50. It is noted that a manner of setting the user-specific image data is not limited to this manner. That is, any manner may be employed as long as the user can specify which image is an image based on the user-specific image data.

Figure 8C:
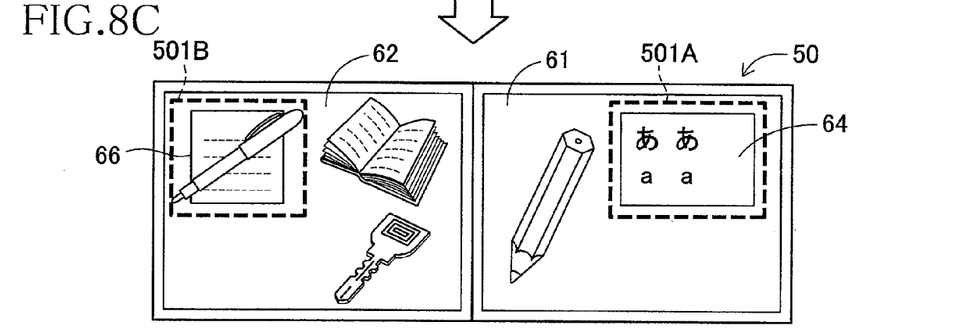

In S202, the CPU 22 obtains, on the basis of the coordinates axes set in S105, S106 (with reference to FIG. 3), coordinates defined based on the input received in S201 and stores a start point and an end point of the coordinates into the RAM 26. Here, the start point is a position at which the user has touched the display panel 50 with his or her finger for the first time by the dragging operation while the end point is a position at which the user has touched the display panel 50 with his or her finger for the last time by the dragging operation. In S203, the CPU 22 displays rectangles (rectangle frames, marks) whose one of pairs of diagonal or opposite corners are located at coordinates of the start point and the end point stored in the RAM 26 in S202 such that the rectangles respectively overlap the first image 61 and the second image 62 displayed on the display panel 50. FIG. 8C shows an example of a result of displaying of the display panel 50 when the user performs input indicated in FIG. 8B and the CPU 22 performs the processings of S201-S203 where the recording direction of the one recording surface on which the image recording is performed on the basis of the first image data and the recording direction of the other recording surface on which the image recording is performed on the basis of the second image data are the same as each other. As described above, where the recording directions of the respective both recording surfaces are the same as each other, the CPU 22 sets the coordinates axes of the first image 61 and the second image 62 so as to be symmetrical with each other with respect to the upward and downward axis. Thus, as shown in FIG. 8C, rectangles 501A, 501B are displayed so as to be symmetrical with each other with respect to the upward and downward axis. As a result, the user can accurately grasp a degree to which the first image 61 and the second image 62 overlap each other in the two-sided recording. It is noted that an area surrounded with the rectangle 501A is a user-specific area (a first specific area) 64 while an area surrounded with the rectangle 501B is a user-specific-area corresponding area (a second specific area) 66.

In S204, the CPU 22 receives an input of the user with the display panel 50. In S205, the CPU 22 judges whether the input received in S204 is for the user-specific area 64 in the rectangle 501A or not. Where the input is for the user-specific area 64 (S205: YES), the CPU 22 identifies in S206 a start point and an end point of coordinates defined based on the input. That is, a position in the user-specific area 64 at which the user has touched the display panel 50 for the first time is identified as the start point and then a position in the user-specific area 64 at which the user has touched the display panel 50 for the last time is identified as the end point. Then, these positions are stored into the RAM 26. In S207, the CPU 22 acquires a difference between coordinates of the start point and the end point stored into the RAM 26 in S206 and then performs a data processing in which the rectangles 501A, 501B and an image based on the first image data corresponding to the user-specific area 64 are moved. In S208, the CPU 22 reflects a result of the movement in S207 in the preview of the display panel 50.

Figure 9A:
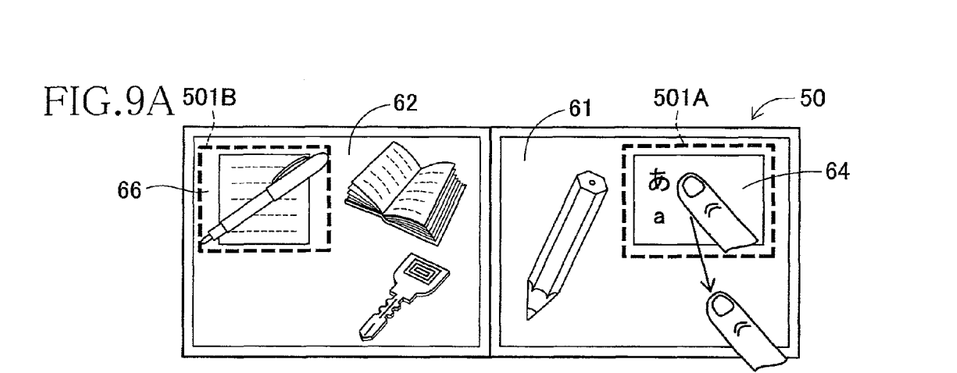
FIGS. 9A, 9B, 9C, 9D are views each showing another example of the image displaying on the display panel.
Figure 9B:
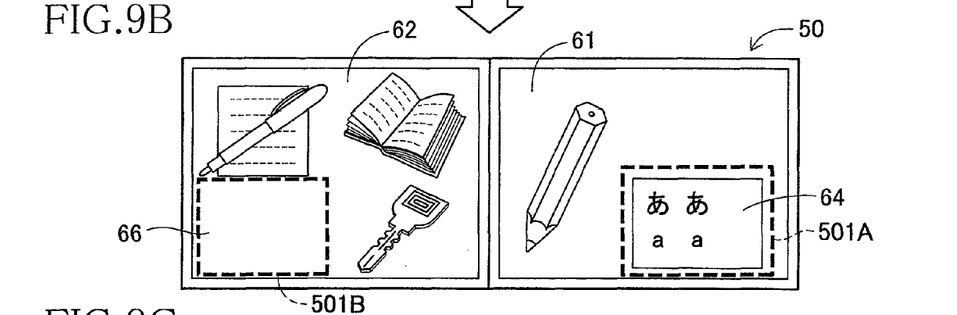

There will be specifically explained the processing of S206-S208 with reference to FIGS. 9A and 9B. For example, as shown in FIG. 9A, where the user-specific area 64 in the rectangle 501A displayed on the right screen of the display panel 50 is touched and dragged by the user, as shown in FIG. 9B, the rectangles 501A, 501B and the image displayed on the user-specific area 64 surrounded with the rectangle 501A are moved on the display panel 50 as a result of the processings of S206-S208.

As thus described, since the user can designate the area of the rectangle and move the image of the area surrounded with the rectangle, the user can adjust the overlapping position of an object on the first image based on the first image data in accordance with a content of the second image based on the second image data. For example, in FIG. 9A, images of characters and a frame enclosing the characters therein surrounded with the rectangle 501A on the first image 61 overlap an image of an illustration of a fountain pen on the second image 62. However, as shown in FIG. 9B, the user can move, by dragging the rectangle 501A, the images of the characters and the frame enclosing the characters therein to a position overlapping a vacant space on the second image 62 to adjust the overlapping position.

On the other hand, where the input received in S204 is not for the user-specific area 64 (S205: NO), the CPU 22 counts, in S209, numbers of touching of the user respectively on the first image 61 and the second image 62. In S210, the CPU 22 performs a data processing in which a recording density of the user-specific area 64 which has been touched by the user is made higher, and a recording density of the user-specific-area corresponding area 66 is made lower in accordance with the numbers of the touching which have been counted in S209. As a result, the respective recording densities of the recording images based on the first and the second image data are changed in accordance with the numbers of touching. In S211, the CPU 22 reflects a result of the change of the densities in S210 in the preview of the display panel 50.

Figure 9C:
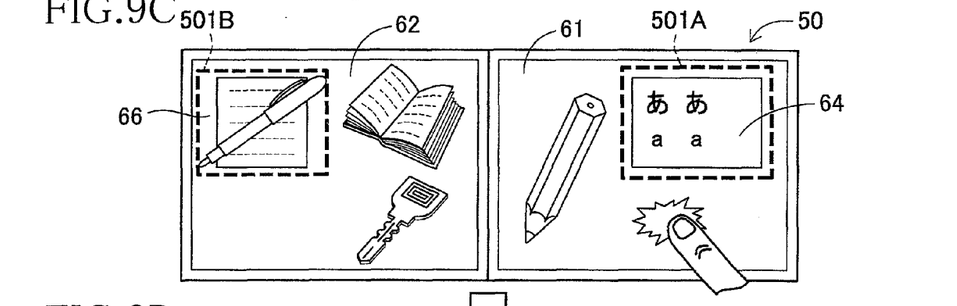
Figure 9D:
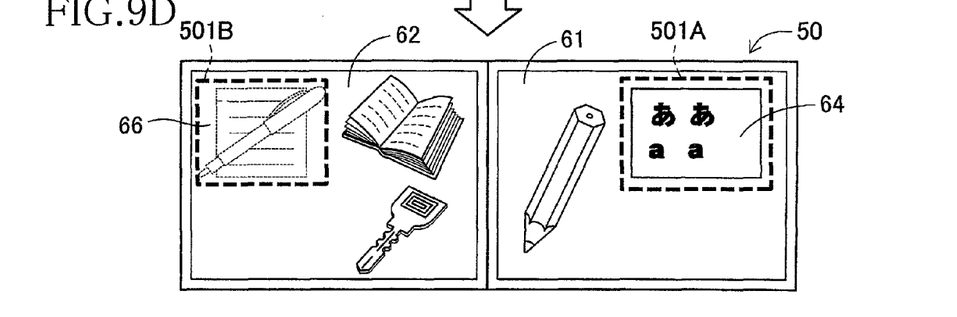

There will be specifically explained the processings of S209-S211 with reference to FIGS. 9C and 9D. FIG. 9D shows an example of a result of displaying of the display panel 50 when the CPU 22 performs the processings of S209-S211 where the user has touched, as shown in FIG. 9C, an area on an outside of the rectangle 501A on the first image 61 displayed on the right screen of the display panel 50. In the processings of S209-S211, the display panel 50 previews, as shown in FIG. 9D, a state in which the recording density of the images of the characters and the frame enclosing the characters therein surrounded with the rectangle 501A is made higher, and the recording density of the image of the illustration of the fountain pen surrounded by the rectangle 501B is made lower.

As thus described, where a recording density of one of the first image 61 and the second image 62 is adjusted by the user, a reverse adjustment is automatically performed for the other of the first image 61 and the second image 62. Thus, since the user only has to designate the recording density only for the one image, an adjustment of an image quality in the two-sided recording can be easily performed, thereby reducing a burden on the user. For example, in FIG. 9C, the images of the characters and the frame enclosing the characters therein surrounded with the rectangle 501A on the first image 61 overlap the image of the illustration of the fountain pen on the second image 62. However, where the images of the characters and the frame enclosing the characters therein are important for the user, the user can make, as shown in FIG. 9D, the recording density of the images of the characters and the frame enclosing the characters therein higher and make the recording density of the images of the characters and the frame enclosing the characters therein lower by touching the area on the outside of the rectangle 501A. In this time, since the total amount of the ink ejected to the both recording surfaces is kept constant, a warp of the sheet due to the soakage of the ink can be prevented. Further, since the first image 61 and the second image 62 of the respective both recording surfaces are respectively displayed on the two screens of the display panel 50, and the overlapping position is indicated by the rectangles 501A, 501B, the user can designate the recording density while visually comparing the first image 61 and the second image 62, thereby improving an operability.

Where the editing processings of S206-S208 or S209-S211 are completed, the CPU 22 judges in S212 whether an "OK" button has been pressed or not. For example, one of the touch-panel button images displayed on the display panel 50 and the keys of the key pad 52 can be employed as the "OK" button. Where the "OK" button has not been pressed (S212: NO), the processing of the CPU 22 returns to S204, and the input of the user is received again to perform the editing processing for a current editing area, i.e., the rectangles 501A, 501B.

On the other hand, where the "OK" button has been pressed (S212: YES), the CPU 22 judges in S213 whether the current editing area is a first area to be edited or not. Where the current editing area is the first area (S213: YES), the CPU 22 sets in S214 a predetermined flag (density information) on one of the recording images whose recording density has been made lower in the editing processing (i.e., the flag is set on the second image 62 in the present embodiment). Which one of the first image 61 and the second image 62 the recording density has been made lower can be judged by referring a count value of the number of touching of the first image 61 and the second image 62 in S209, for example. Then, in S215, the CPU 22 saves and updates an editing processing parameter included in the recording setting stored in the NVRAM 28 and deletes the rectangles 501A, 501B. Then, the CPU 22 returns or performs the main processing in FIG. 3.

Further, where the current editing area is not the first area (S213: NO), the CPU 22 judges in S216 whether the recording image on which the flag is set has been made higher or not. As described above, the flag is set on the recording image whose recording density has been made lower in the editing processing. Thus, where the recording image on which the flag is set has been made higher (S216: YES), an area whose recording density has been made lower and an area whose recording density has been made higher exist in one image. Thus, after the CPU 22 deletes in S217 changing information of the current editing area, and a message thereabout is sent to the display panel 50, the processing of the CPU 22 returns to S204. Then, the input of the user is received again to perform the editing processing for the current editing area, i.e., the user-specific area 64, the user-specific-area corresponding area 66. On the other hand, where the recording image on which the flag is set has not been made higher (S216: NO), the processing of the CPU 22 goes to S215 in which the CPU 22 saves and updates the editing processing parameter included in the recording setting stored in the NVRAM 28 and deletes the rectangles. Then, the CPU 22 returns or performs the main processing in FIG. 3.

There will be explained the main processing in the two-sided recording after the image data editing processing in S107 with reference to the flow-chart in FIG. 3 again. In S108, the CPU 22 judges whether a "copy" button has been pressed or not. Like the "OK" button, one of the touch-panel button images displayed on the display panel 50 and the keys of the key pad 52 can be employed as the "copy" button. Where the "copy" button has not been pressed (S108: NO), the CPU 22 returns to or performs the image data editing processing in S107 again.

On the other hand, where the "copy" button has been pressed (S108: YES), the CPU 22 determines in S109 a recording order. Specifically, the CPU 22 determines the recording order by referring to the flag set in S214 (with reference to FIG. 4) such that the recording image on which the flag is set, i.e., the recording image whose recording density has been made lower is recorded first. In S110, the CPU 22 performs the two-sided recording in the recording order determined in S109 on the basis of the editing processing parameter saved and updated in the image data editing processing in S107. Since the recording image whose recording density has been made lower is recorded first, the warp of the sheet due to the soakage of the ink can be reduced, thereby preventing a jamming of the sheet and an ink stain.

An example of the two-sided recording processing of the MFD 10 has been explained with reference to the flow-charts in FIGS. 3 and 4. Subsequently, there will be explained another example of the two-sided recording processing of the MFD 10 with reference to FIGS. 5 and 6.

In the image data editing processing performed in S107 in the main processing shown in FIG. 3, as explained in detail with reference to FIG. 4, the CPU 22 changes the recording densities of the respective both recording images in accordance with the numbers of touching of the user respectively on the first image 61 and the second image 62. That is, where the input received in S204 is not for the user-specific area 64 (S205: NO), the CPU 22 changes in S209-S211 the recording densities of the respective both recording images in accordance with the numbers of touching of the user respectively on the first image 61 and the second image 62. However, the change of the recording densities may be performed in accordance with a distance or a time period of touching instead of the numbers of touching. Where the input received in S204 is not for the user-specific area 64 (S205: NO), the CPU 22 can change the recording densities in accordance with the distance or the time period of touching by performing a processing in FIG. 5 or FIG. 6 instead of the processings of S209-S211. There will be explained both cases.

<Case in Which Recording Densities are Changed in Accordance with Distance of Touching>

Figure 5:
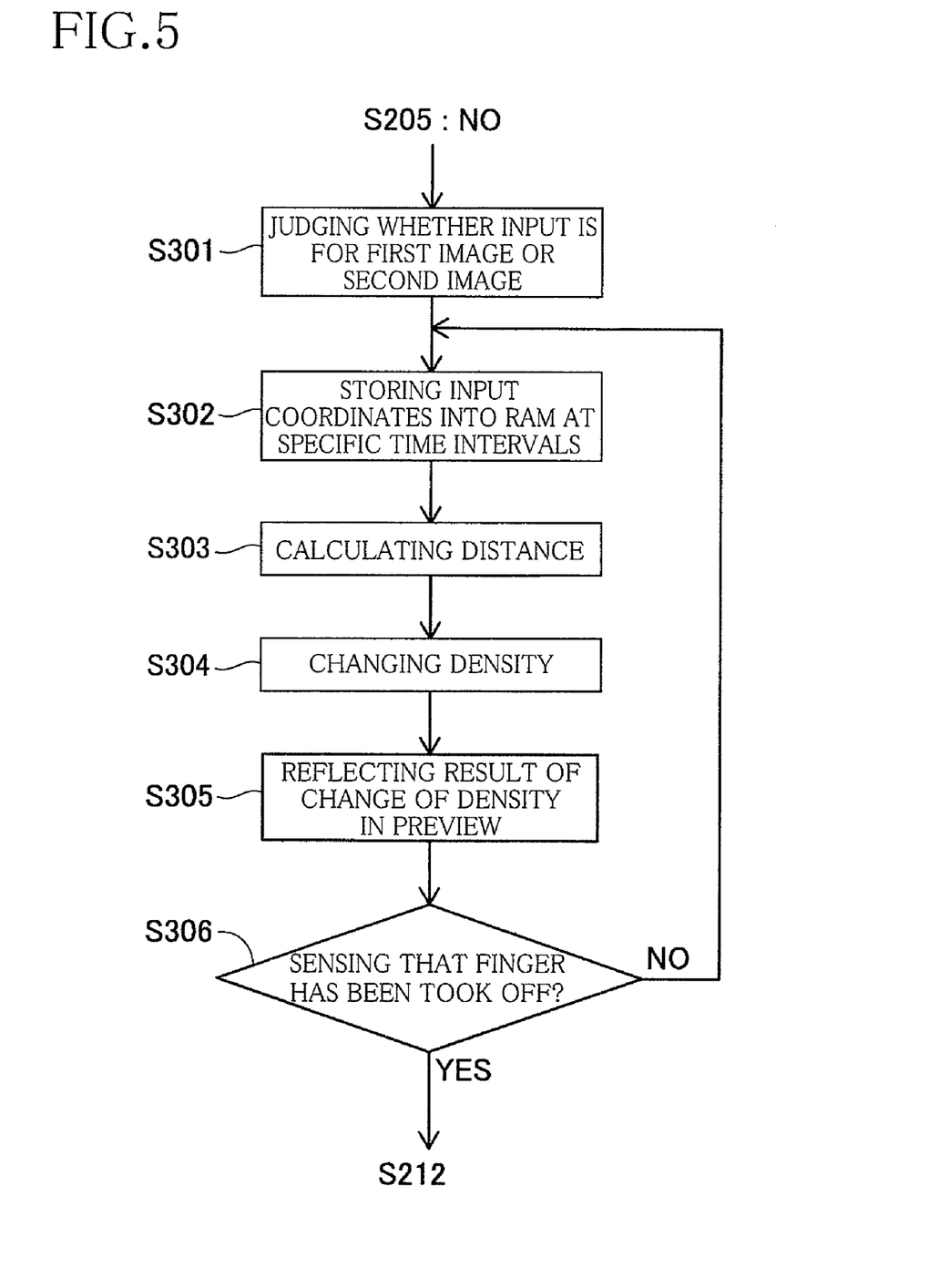
FIG. 5 is a flow-chart indicating another example of the image data editing processing.

As shown in FIG. 5, in S301, the CPU 22 judges whether the input of the user is for the first image 61 or the second image 62. Then, in S302, the CPU 22 stores, into the RAM 26, two pairs of coordinates defined based on inputs at two times which are spaced at a specific time interval and calculates in S303 a distance between the two pairs of the coordinates defined based on the input. In S304, the CPU 22 performs the data processing in which the recording density of the user-specific area 64 on the first image 61 for which the input has been performed by the user is made higher, and the recording density of the user-specific-area corresponding area 66 on the second image 62 is made lower in accordance with the distance calculated in S303. In S305, the CPU 22 reflects a result of the change of the densities in S304 in the preview of the display panel 50. In S306, the CPU 22 judges whether the CPU 22 has sensed that the finger has been took off from the display panel 50 or not. Where the CPU 22 has sensed that the finger has been took off (S306: YES), the processing of the CPU 22 goes to S212 (with reference to FIG. 4). On the other hand, where the CPU 22 has not sensed that the finger has been took off (S306: NO), the processing of the CPU 22 returns to S302. As a result, the user performs the input by sliding his or her finger on the screen of the display panel 50, thereby changing the densities in accordance with the slid distance.

<Case in Which Recording Densities are Changed in Accordance with Time Period of Touching>

Figure 6:
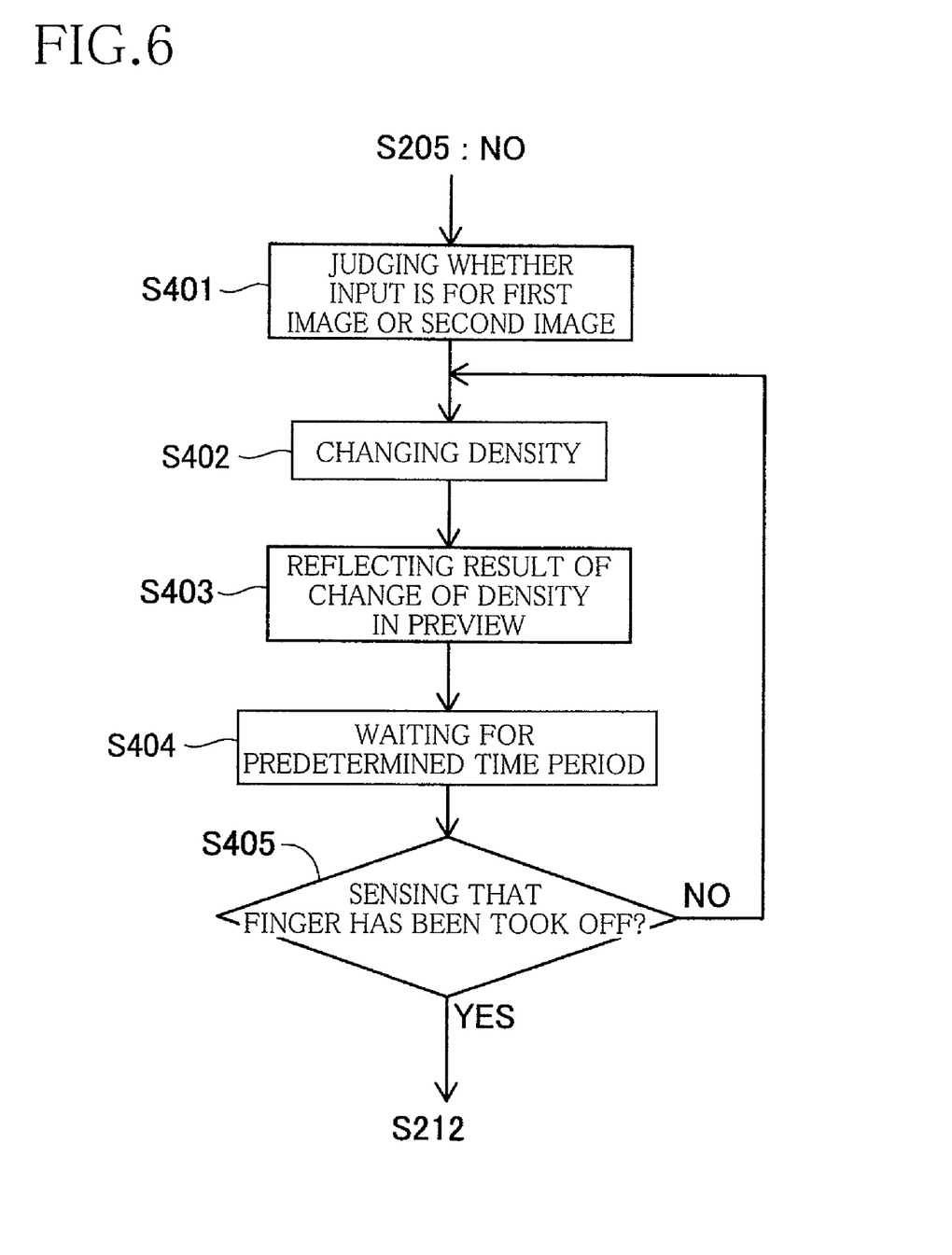
FIG. 6 is a flow-chart indicating another example of the image data editing processing.

As shown in FIG. 6, the CPU 22 judges in S401 whether the input is for the first image 61 or the second image 62. Then, in S402, the CPU 22 performs the data processing in which the recording density of the user-specific area 64 on the first image 61 for which the input has been performed by the user is made higher, and the recording density of the user-specific-area corresponding area 66 on the second image 62 is made lower. In S403, the CPU 22 reflects a result of the change of the densities in S402 in the preview of the display panel 50. In S404, the CPU 22 waits for a predetermined time period. In S405, the CPU 22 judges whether the CPU 22 has sensed that the finger has been took off from the display panel 50 or not. Where the CPU 22 has sensed that the finger has been took off (S405: YES), the processing of the CPU 22 goes to S212 (with reference to FIG. 4). On the other hand, where the CPU 22 has not sensed that the finger has been took off (S405: NO), the processing of the CPU 22 returns to S402. As a result, the user performs the input by continuing to press the screen of the display panel 50 with his or her finger, thereby changing the densities in accordance with a time period of pressing.

Figure 7:
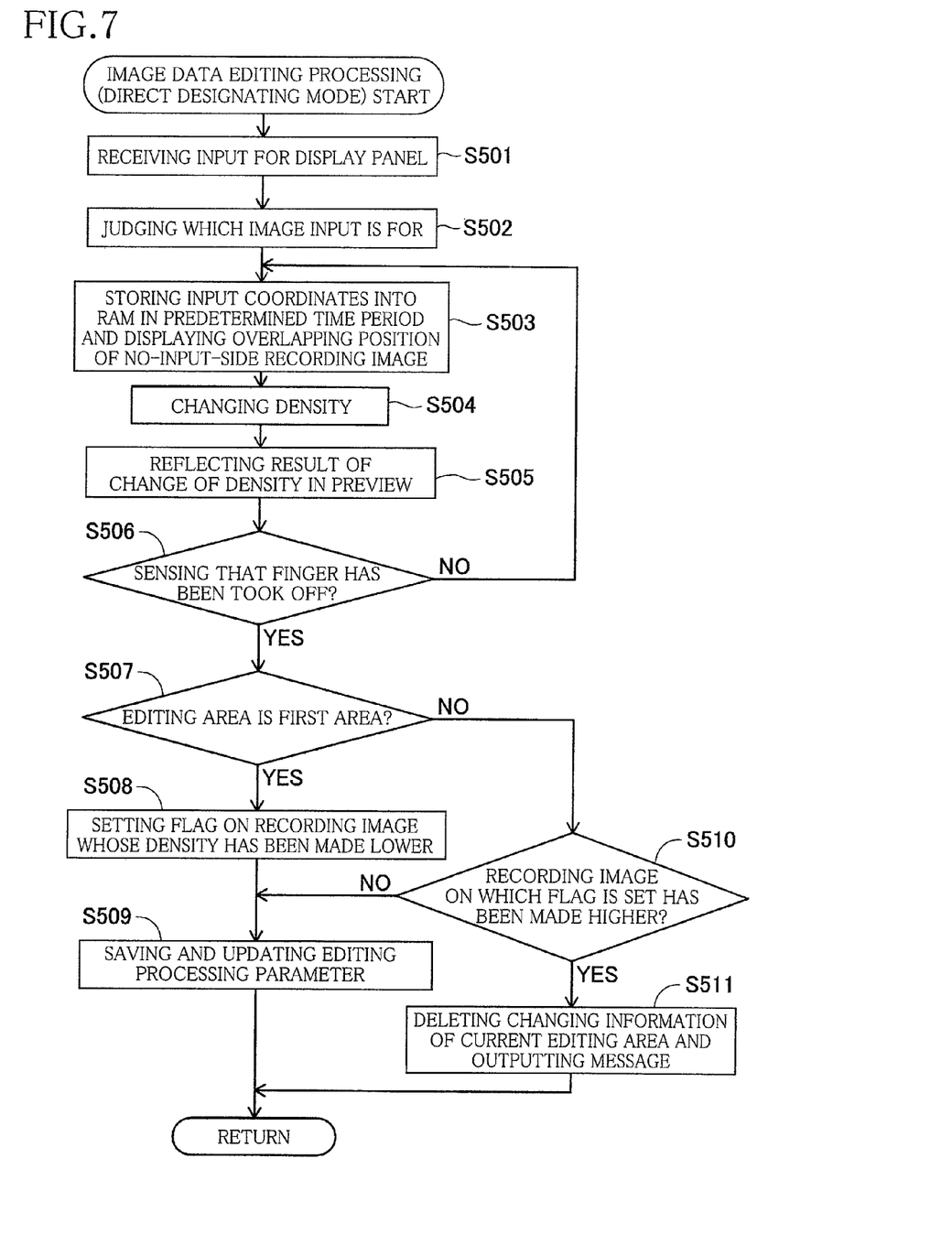
FIG. 7 is a flow-chart indicating another example of the image data editing processing.

There will be next explained another example of the two-sided recording processing of the MFD 10 with reference to the flow-chart shown in FIG. 7.

In the image data editing processing performed in S107 in the main processing shown in FIG. 3, as explained in detail with reference to FIG. 4, the CPU 22 changes the recording densities respectively for the user-specific area 64 and the user-specific-area corresponding area 66 on the basis of the input of the user. However, the change of the recording densities may be directly performed for the coordinates corresponding to a touched position or an area enclosing the coordinates corresponding to the touched position as the user-specific area 64 and the user-specific-area corresponding area 66.

Figure 8D:
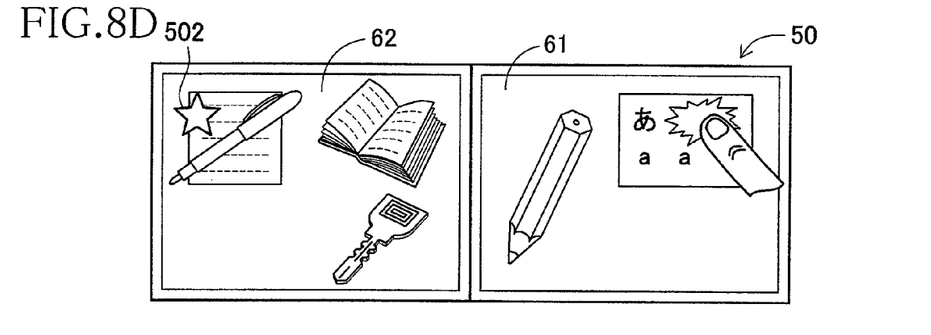

FIG. 7 shows the flow-chart indicating a direct designating mode of the image data editing processing in which the recording densities are directly changed for the coordinates corresponding to the touched position. In S501, the CPU 22 receives the input of the user with the display panel 50. In S502, the CPU 22 judges which recording image the input is for. In S503, the CPU 22 successively stores, into the RAM 26, the coordinates defined based on the input in a predetermined time period, and displays on the display panel 50 the overlapping position of one of the recording images for which the input has not been performed by the user (i.e., a no-input-side recording image). As shown in FIG. 8D, the displaying of the overlapping position is performed by displaying a star-shaped mark 502, for example.

In S504, the CPU 22 performs, for the coordinates stored in the RAM 26 in S503, a processing in which the recording density of the recording image for which the input has been performed by the user is made higher, and the recording density of the other recording image is made lower. In S505, the CPU 22 reflects a result of the change of the densities in S504 in the preview of the display panel 50. In 506, the CPU 22 judges whether the CPU 22 has sensed that the finger has been took off from the display panel 50 or not. Where the CPU 22 has not sensed that the finger has been took off (S506: NO), the processing of the CPU 22 returns to S503. As a result, the user can directly designate the area whose recording density is wanted to be changed by the user by touching the screen of the display panel 50, thereby performing the operation of the change of the densities.

On the other hand, where the CPU 22 has sensed that the finger has been took off (S506: YES), the CPU 22 performs processings of S507-S511. The processings of S507-S511 are the same as the processings of S213-S217 explained with reference to FIG. 4, and the explanation of which is dispensed with. As thus described, the CPU 22 can not only change the recording densities for the areas respectively designated by the rectangles but also directly change the recording densities for the touched coordinates. Further, the MFD 10 may be configured such that the user can select one of these changing means.

In view of the above, the MFD 10 can be considered to include a first density adjusting section which is configured to make the adjustment to the recording density for at least part of the first image data and which performs the processings of S210, S304, S402, and S504. Further, the MFD 10 can also be considered to include a second density adjusting section which is configured to make the adjustment, reverse to the adjustment to the recording density by the first density adjusting section, to the recording density for at least part of the second image data, and which performs the processings of S210, S304, S402, and S504. Further, the MFD 10 can also be considered to include a coordinate-axes setting section which is configured to set the coordinate axes for specifying the position on the first image 61 and the position on the second image 62 and which performs the processings of S104-S106. Further, the MFD 10 can also be considered to include a moving section which is configured to move the user-specific area 64 within a range of the first image 61 after the user-specific area 64 has been specified by the user and which performs the processing of S207.

Explained as described above, according to the embodiment of the present invention, since the MFD 10 includes a new user interface, the user can operate intuitively and easily, thereby easily adjusting the image quality in the two-sided recording. Further, it is possible to prevent the jamming of the sheet and the ink stain in the two-sided recording.

It is to be understood that the invention is not limited to the details of the illustrated embodiment, but may be embodied with various changes and modifications, which may occur to those skilled in the art, without departing from the spirit and scope of the present invention. For example, each of the flow-charts in the above-described embodiment is merely an example, and the processings may be performed by another flow-chart as long as the same results as the results obtained in each of the above-described flow-charts can be obtained. Further, in the above-described embodiment, the user performs the input operation on the touch panel of the MFD 10, but the MFD 10 may be configured such that the user performs the input operation, by, e.g., a mouse, on a display of the personal computer connected to the LAN line 70.

It is noted that, in the above-described embodiment, the recording density of the image only in the rectangle which has been specified by the user is changed, but the present invention is not limited to this configuration. For example, the MFD 10 may be configured such that the two-sided recording is performed in a state in which a recording density of an entirety of one of recording images which has been specified by the user is made higher while a recording density of an entirety of the other of the recording images is made lower. Also in the case where the MFD 10 is thus configured, an adjustment is performed for a recording density of one of recording images, and an adjustment reverse to the adjustment for the recording density of the one recording image is performed for a recording density of the other of the recording images. Thus, the recording densities can be easily changed in the two-sided recording. It is noted that, in the reverse adjustment of the recording density, the recording densities may be adjusted such that the recording density of the one of recording images is made higher while the recording density of the other of the recording images is made lower. Further, the recording densities may also be adjusted such that the recording density of the one of recording images is made lower while the recording density of the other of the recording images is made higher.

Further, in the above-described embodiment, the recording density of the second image 62 is made lower (higher) in accordance with a degree to which the recording density of the first image 61 is made higher (lower), but the present invention is not limited to this configuration. That is, the degree to which the recording density of the first image 61 is made higher (lower) and a degree to which the recording density of the second image 62 is made lower (higher) does not need to coincide with each other. For example, the degree to which the recording density of the first image 61 is made higher (lower) may be larger than the degree to which the recording density of the second image 62 is made lower (higher). Further, the degree to which the recording density of the first image 61 is made higher (lower) may be smaller than the degree to which the recording density of the second image 62 is made lower (higher).

Further, in the above-described embodiment, the user-specific area which is an area enclosed with the rectangle is specified by the user, but the present invention is not limited to this configuration. For example, the MFD 10 may be configured such that an object included in the first image 61, based on which the image recording is performed on one of the recording surfaces, is automatically detected by the CPU 22, and a recording density for the detected object is changed automatically or on the basis of a command of the user. Further, the MFD 10 may be configured such that an object included in the second image 62, based on which the image recording is performed on the other of the recording surfaces, is automatically detected by the CPU 22, and a recording density for the detected object is changed automatically or on the basis of a command of the user. Where the MFD 10 is thus configured, the user does not need to specify the user-specific area, thereby performing the change of the recording densities more easily in the two-sided recording.

Further, in the above-described embodiment, the user-specific area is an area enclosed with the rectangle, but the present invention is not limited to this configuration. For example, the user-specific area may have another shape such as a circle, an ellipse, and a polygon. Further, a means for specifying the user-specific area is not limited to a configuration in which the user performs the dragging operation on the display panel 50. For example, the user may specify two points or positions on the display panel 50 by touching, whereby a rectangle whose one of pairs of diagonal are respectively located at the two positions is set as the user-specific area. Where the MFD 10 is thus configured, in the case where a relatively large area on the display panel 50 is specified, the user does not need to perform the dragging operation for a relatively long distance, thereby easily specifying the user-specific area. Further, the MFD 10 may also be configured such that a cursor is displayed on the first image 61 on the display panel 50, and positions of the respective diagonal corners are specified by an operation of the user with buttons provided at positions different from the display panel 50.

What is claimed is:
1. An image recording apparatus configured to perform recording on both recording surfaces of a recording medium, comprising:
a storing portion configured to store (a) first image data based on which the recording is performed on one of the recording surfaces of the recording medium and (b) second image data based on which the recording is performed on the other of the recording surfaces of the recording medium;
a first density adjusting section configured to make an adjustment to a recording density for at least part of the first image data on the basis of an input of a user;
a second density adjusting section configured to make an adjustment to a recording density for at least part of the second image data, the adjustment being reverse to the adjustment to the recording density by the first density adjusting section; and
a recording section configured to perform the recording on the basis of (a) the first image data adjusted by the first density adjusting section and (b) the second image data adjusted by the second density adjusting section,
wherein the first density adjusting section is configured to make the adjustment to the recording density for a first specific area which corresponds to the part of the first image data, and wherein the second density adjusting section is configured to make the adjustment to the recording density for a second specific area which corresponds to the part of the second image data and which is opposite to the first specific area, and
further comprising a preview displaying portion configured to display (a) a first image which represents a recording image based on the first image data and (b) a second image which represents a recording image based on the second image data, and configured to display on the first image a mark indicating the first specific area and to display on the second image a mark indicating the second specific area such that the marks respectively overlap the first image and the second image.

2. The image recording apparatus according to claim 1, further comprising a coordinate-axes setting section configured to set, by setting an upward and downward axis and a rightward and leftward axis for each of the first image and the second image, coordinate axes respectively for specifying a position on the first image and a position on the second image,
wherein where a recording direction of the one recording surface on which the recording is performed on the basis of the first image data is the same as a recording direction of the other recording surface on which the recording is performed on the basis of the second image data, the coordinate-axes setting section sets the coordinate axes set for the first image and the coordinate axes set for the second image such that the coordinate axes are symmetrical with each other with respect to the upward and downward axis, and
wherein where the recording direction of the one recording surface on which the recording is performed on the basis of the first image data is different from the recording direction of the other recording surface on which the recording is performed on the basis of the second image data, the coordinate-axes setting section sets the coordinate axes set for the first image and the coordinate axes set for the second image such that the coordinate axes are symmetrical with each other with respect to the rightward and leftward axis.

3. The image recording apparatus according to claim 2, wherein the second specific area is specified on the second image in correspondence with the first specific area.

4. The image recording apparatus according to claim 1, wherein the first specific area is specified as the part of the first image data by being specified by the user on the preview displaying portion.

5. The image recording apparatus according to claim 1,
wherein the preview displaying portion is a touch panel display, and
wherein the first specific area is specified on the first image, on the basis of a position specified on the touch panel display.

6. The image recording apparatus according to claim 5,
wherein the first specific area is specified by an operation of the user on the touch panel display and is an area surrounded with a rectangle whose diagonal corners are respectively located on two points specified by the operation.

7. The image recording apparatus according to claim 6,
wherein the first specific area is specified by a dragging operation of the user on the touch panel display and is an area surrounded with a rectangular frame whose diagonal corners are respectively located on a start point and an end point of the dragging operation.

8. The image recording apparatus according to claim 1, further comprising a moving section configured to move the first specific area within a range of the first image after the first specific area has been specified by the user.

9. The image recording apparatus according to claim 8,
wherein the first specific area is specified by an area surrounded with a rectangular frame provided on the basis of an input of the user, and
wherein the moving section is configured to move image data corresponding to the area surrounded with the rectangular frame, with the first specific area.

10. The image recording apparatus according to claim 9,
wherein the second specific area is specified by an area surrounded with a rectangular frame corresponding to the rectangular frame representing the first specific area, and
wherein the moving section is configured to move the rectangular frame representing the second specific area in synchronization with the movement of the first specific area.

11. The image recording apparatus according to claim 1, further comprising a density-information storing portion storing density information indicating which one of the first image data and the second image data the recording density thereof has been made higher or lower with respect to the other data, on the basis of a result of the adjustments of the first density adjusting section and the second density adjusting section,
wherein, on the basis of the density information stored in the density-information storing portion, the recording section performs the recording on the other recording surface of the recording medium on the basis of the image data whose recording density has been made higher after performing the recording on the one surface of the recording medium on the basis of the image data whose recording density has been made lower.

12. The image recording apparatus according to claim 1,
wherein the preview displaying portion is configured to display (a) the first image based on the first image data whose recording density has been adjusted by the first density adjusting section and (b) the second image based on the second image data whose recording density has been adjusted by the second density adjusting section.

13. A non-transitory computer-readable storage medium storing a program executed by an image recording apparatus configured to perform recording on both recording surfaces of a recording medium, the program comprising:
making an adjustment to a recording density for at least part of first image data stored in a storing portion, on the basis of an input of a user;
making an adjustment to a recording density for at least part of second image data stored in the storing portion, the adjustment being reverse to the adjustment to the recording density for the at least part of the first image data; and
performing the recording on the basis of the first image data and the second image data,
wherein making the adjustment to the recording density for at least part of first image data comprises making the adjustment to the recording density for a first specific area which corresponds to the part of the first image data, and wherein making the adjustment to the recording density for at least part of second image data comprises making the adjustment to the recording density for a second specific area which corresponds to the part of the second image data and which is opposite to the first specific area, and
further comprising displaying (a) a first image which represents a recording image based on the first image data and (b) a second image which represents a recording image based on the second image data, and displaying on the first image a mark indicating the first specific area and displaying on the second image a mark indicating the second specific area such that the marks respectively overlap the first image and the second image.

* * * * *